United States Patent
Tsusaka et al.

(10) Patent No.: US 7,177,857 B2
(45) Date of Patent: Feb. 13, 2007

(54) APPARATUS AND METHOD FOR CREATING DISTRIBUTION CONTENT

(75) Inventors: Yuko Tsusaka, Osaka (JP); Kazuo Kajimoto, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 615 days.

(21) Appl. No.: 09/989,607

(22) Filed: Nov. 21, 2001

(65) Prior Publication Data

US 2002/0065816 A1 May 30, 2002

(30) Foreign Application Priority Data

Nov. 24, 2000 (JP) ............................. 2000-357930

(51) Int. Cl.
*G06F 17/30* (2006.01)
(52) U.S. Cl. .............. 707/3; 725/32; 705/1; 369/30.12; 369/41
(58) Field of Classification Search ................ 707/3, 707/5, 10, 9; 705/26, 1; 715/512; 369/30.12, 369/41; 725/32
See application file for complete search history.

(56) References Cited

U.S. PATENT DOCUMENTS

| | | | | |
|---|---|---|---|---|
| 5,778,135 A | * | 7/1998 | Ottesen et al. | 386/52 |
| 6,006,241 A | * | 12/1999 | Purnaveja et al. | 715/512 |
| 6,466,920 B1 | * | 10/2002 | Okayama et al. | 705/57 |
| 6,611,812 B2 | * | 8/2003 | Hurtado et al. | 705/26 |
| 6,885,748 B1 | * | 4/2005 | Wang | 380/201 |
| 2001/0041050 A1 | * | 11/2001 | Iwata et al. | 386/52 |
| 2001/0044780 A1 | | 11/2001 | Miyazaki et al. | 705/53 |
| 2002/0049717 A1 | * | 4/2002 | Routtenberg et al. | 707/1 |
| 2002/0109707 A1 | * | 8/2002 | Lao et al. | 345/700 |
| 2003/0161473 A1 | * | 8/2003 | Fransdonk | 380/277 |
| 2005/0267879 A1 | * | 12/2005 | Sekiguchi et al. | 707/3 |
| 2006/0053077 A1 | * | 3/2006 | Mourad et al. | 705/51 |
| 2006/0085343 A1 | * | 4/2006 | Lisanke et al. | 705/50 |

FOREIGN PATENT DOCUMENTS

| | | |
|---|---|---|
| EP | 0 715 246 | 6/1996 |
| EP | 9 878 796 | 11/1998 |
| EP | 1 014 724 | 6/2000 |
| JP | 11-085504 | 3/1999 |
| JP | 2000-253351 | 9/2000 |

(Continued)

OTHER PUBLICATIONS

Rump N. et al.: "White Paper on the Secure Digital Music Initiative SDMI", Fraunhofer Institut Fur Integrierte Schaltungen, Mar. 1999, pp. 1-10.

(Continued)

*Primary Examiner*—Don Wong
*Assistant Examiner*—Hanh Thai
(74) *Attorney, Agent, or Firm*—Wenderoth, Lind & Ponack, L.L.P.

(57) ABSTRACT

A distribution content provided with conditions that are only effective to part of a content body is created. On a time axis, a section of a content body is specified. Management data is then created which indicates use conditions that are only effective to the specified section, and the created management data is provided to the content body for distribution.

16 Claims, 12 Drawing Sheets

FOREIGN PATENT DOCUMENTS

| WO | 99/48296 | 9/1999 |
| WO | 00/16229 | 3/2000 |

OTHER PUBLICATIONS

"MPEG-4 Overview—(Dublin version)", International Organization for Standardization—Organisation Internationale De Normalisation, XX, XX, No. ISO/IEC JTC1/SC, Jul. 1998, pp. 1-55.

Chaddha N: "A software only scalable video delivery system for multimedia application over heterogeneous networks" Proceedings of the International Conference on Image Processing. (ICIP). Washington, Oct. 23-26, 1995, Los Alamitos, IEEE Comp. Soc. Press, US, vol. 3, Oct. 23, 1995, pp. 404-407

* cited by examiner

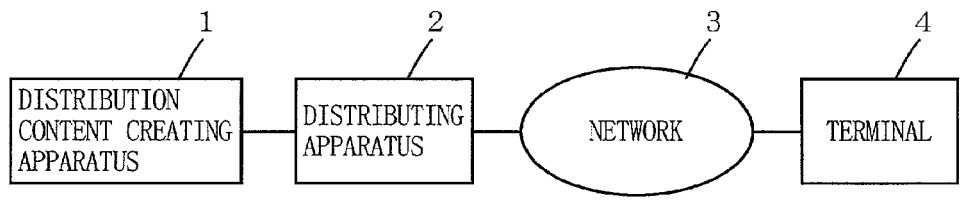
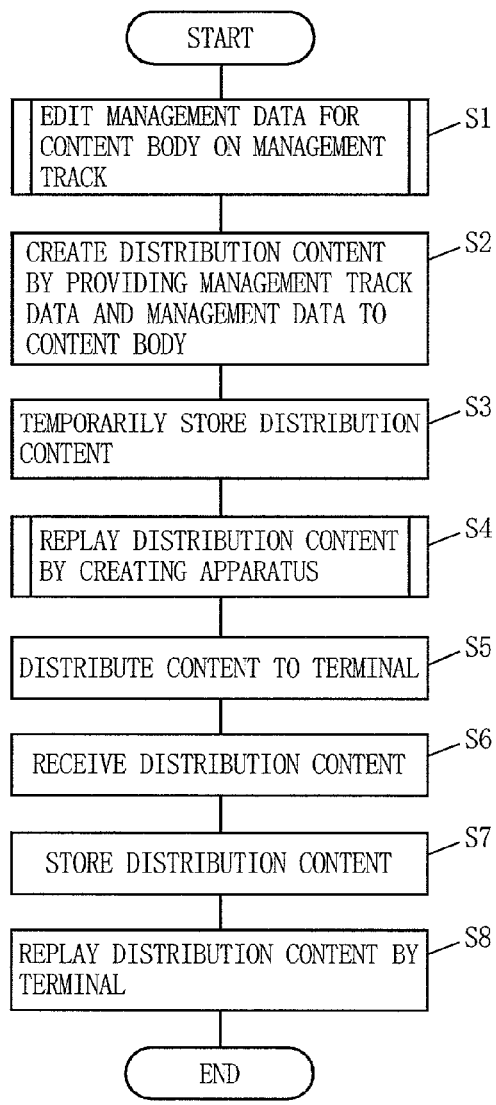

| | in / out | REPLAY CONDITION | BILLING CONDITION |
|---|---|---|---|
| MANAGEMENT DATA 208 | t1 / t2 | UNCONDITIONAL | — |
| MANAGEMENT DATA 212 | (0) / (end) | CONDITIONAL | 200 YEN |
| ⋮ | ⋮ | ⋮ | ⋮ |

APPARATUS AND METHOD FOR CREATING DISTRIBUTION CONTENT

BACKGROUND OF THE INVENTION

1. Field of the Invention

The present invention relates to distribution content creating apparatuses and, more specifically, to a distribution content creating apparatus for creating a video or music content which is provided with use conditions.

2. Description of the Background Art

In recent years, content distribution services have become available for distributing video or music contents to terminals such as personal computers and portable phones. In such a content distribution service, a content (content body) is not simply distributed by itself. In order to prevent an illegal copy of the content body, the content body is provided with conditions restricting the use of the content body, thereby forming a content for distribution (distribution content). In consideration of the foreseeable expansion of the content distribution service, it is urgently required to develop distribution content creating apparatuses which are capable of efficiently creating various distribution contents.

A conventional distribution content creating apparatus creates a distribution content according to the following procedure. That is, the conventional apparatus stores content bodies, and edits management data for the respective content bodies. Then, the generated management data is provided to the content body, and the resulting content is the distribution content, which is handled as a package.

The management data that is edited by the conventional apparatus includes data indicating conditions for the use of the content body at destination terminals, such as "playable only when a fee is paid", and "playable within a certain period". In the conventional apparatus, such management data is generated and provided to the respective content bodies.

The distribution content that is created in the above-described manner is temporarily stored in the distribution content creating apparatus, and is then forwarded to a distributing apparatus. The distributing apparatus distributes the forwarded distribution content to a terminal through a network. The terminal receives the distribution content, and replays the content body according to the management data which is provided to the content.

As described above, the conventional distribution content creating apparatus creates a distribution content including a content body which is provided with conditions restricting the use of the content body at the terminals. Therefore, for example, it is possible to distribute a promotion distribution content that is playable for free only within a predetermined period and a full-package distribution content that is playable upon payment of a fee.

In the conventional distribution content creating apparatus, one piece of management data is provided for each content body. Therefore, replay restriction and billing can be disadvantageously made only by the unit of the content body. If a distribution content such as one that is provided with conditions that are effective only to part of the content body can be created, the distribution content will be usable for various purposes which have not been achievable so far, hopefully leading to a boost in sales of contents through distribution.

Another disadvantage of the conventional apparatus is that different distribution contents have to be created for different purposes for the same content body, and stored in the apparatus. For example, a promotion distribution content and a full-package distribution content have to be created and stored for the same content body. Therefore, the same content body is redundantly stored, thereby wasting a large amount of storage. At the terminal side, if the user desires to try the content first before purchase, the user has to first receive the promotion distribution content, and then further receive the full-package distribution content. This means that the user has to redundantly receive the same content body, thereby wasting time and communications cost.

SUMMARY OF THE INVENTION

Therefore, an object of the present invention is to provide an apparatus which is capable of creating a distribution content provided with a condition that is only effective to part of a content body.

Another object of the present invention is to provide an apparatus which is capable of creating a distribution content including a content body that is provided with a plurality of conditions respectively corresponding to various use purposes.

The present invention has the following features to attain the objects described above.

A first aspect of the present invention is directed to a distribution content creating apparatus that includes:

content storage means for storing content bodies;

distribution content creating means for creating a distribution content by reading a content body from the content storage means and providing the content body with a use condition; and content storage means for storing the distribution content which is created by the distribution content creating means.

Further, in the distribution content creating apparatus of the first aspect, the distribution content creating means includes management data editing means for editing management data indicating the use condition which is effective to a specific section of the read content body, and the distribution content creating means creates the distribution content by providing the content body with at least one piece of management data which is edited by the management data editing means.

In the first aspect (also in the following tenth and eleventh aspects), a specific section of the content body is defined, and management data indicating the use condition which is only effective to the specified section is edited. Then, the management data is provided to the content body for distribution. Thus, it is possible to create a distribution content provided with the use condition which is only effective to part of the content body.

The above created distribution content is stored in the distribution content creating apparatus, and is then distributed by a distributing apparatus to a terminal. The terminal receives and stores the distribution content, and then reads the distribution content for replay. When replaying the distribution content, the terminal replays the specific section of the content body based on the management data.

According to a second aspect of the present invention, in accordance with the first aspect, the use condition that is indicated by the management data prohibits the use of the section which is specified by the management data, allows the use of the section which is specified by the management data for free, or allows the use of the section which is specified by the management data in return for the payment of a predetermined fee.

In the above-described second aspect, a specific section of the content body is defined and can be set so that the terminal is prohibited from using the specific section of the content body, or so that the terminal is allowed to use the specific section of the content body for free or upon payment of a fee.

According to a third aspect, in accordance with the first aspect, the management data further indicates a replay order of the section which is specified by the management data.

In the above-described third aspect, the terminal can arbitrarily set the order of replaying the sections.

According to a fourth aspect of the present invention, in accordance with the first aspect, the distribution content creating means creates the distribution content by further providing the content body with a plurality of pieces of management track data, and each piece of management track data defines a collection of at least one piece of the management data indicating at least one section which is used for a predetermined purpose as one management track corresponding to the predetermined purpose.

In the above-described fourth aspect, it is possible to create a distribution content including a content body which is provided with a plurality of pieces of management track data corresponding to various use purposes (for example, for a promotion purpose where the content body is allowed to be only partly used for free, or for a full-package purpose where the entire content body is allowed to be used upon payment of a fee). Consequently, as compared with the conventional apparatus that creates different distribution contents for different use purposes, the redundancy of storing the same content body can be eliminated, thereby saving the storage amount of the distribution content creating apparatus side and the terminal side, and also reducing the cost of communications at the time of distribution. Furthermore, only one distribution content is enough to be received by the terminal side for using the content body for a user's desired purpose.

According to a fifth aspect of the present invention, in accordance with the fourth aspect, the apparatus further includes character input means for supplying a character input, and GUI input means for supplying a GUI input. According to the fifth aspect, the management data editing means makes a GUI screen be displayed, where the GUI screen includes including a plurality of management tracks that are provided along a time axis, and the management data editing means edits the management data of the specific section by receiving, through the character input means, a start time and an end time for defining the specific section of the content body on the time axis, and the use condition for the predetermined purpose. Further, the management data editing means places, based on the edited management data, a bar on the management track corresponding to the purposes in the GUI screen.

In the above-described fifth aspect, for each content use purpose (for example, for a promotion purpose where the content body is allowed to be only partly used for free, or for a full-package purpose where the entire content body is allowed to be used upon payment of a fee), a start time and an end time for defining a section on the time axis, and a use condition are inputted as character inputs, thereby editing the management data for that section. Then, based on the management data which is obtained for each purpose, a bar corresponding to each section (the bar with one end located at the start time and the other end located at the end time) is placed on the management track corresponding to the purpose in the GUI screen.

According to a sixth aspect of the present invention, in accordance with the fifth aspect, the distribution content creating means further includes management data storage means for storing the management data that is edited by the management data editing means.

In the above-described sixth aspect, the management data is stored separately from the distribution content including the content body which is provided with the management data.

According to a seventh aspect of the present invention, in accordance with the sixth aspect, the management data editing means reads the management data previously edited from the management data storage means, and places, based on the read management data, a bar on the management track in the GUI screen. Further, the management data editing means edits the management data by moving one end and/or the other end of the bar along the time axis through an operation by the GUI input means.

In the above-described seventh aspect, when the management data is edited, a bar is displayed on the management track of the GUI screen based on the management data which was previously edited. Then, by moving either or both of the ends of the bar by the GUI input means, the management data is edited. This saves the operator from having to supply character inputs.

According to an eighth aspect of the present invention, in accordance with the fourth aspect, the distribution content creating means further includes replay means for reading the distribution content from the distribution content storage means and replaying, based on the management data, the specific section of the content body.

In the above-described eighth aspect, the operator of the distribution content creating apparatus can check how the distribution content will be replayed at the terminal side.

According to a ninth aspect of the present invention, in accordance with the eighth aspect, the replay means selects one of the plurality of pieces of management track data that is included in the read distribution content and, based on at least one piece of the management data which is included in the management track that is defined by the management track data, replays at least one specific section of the content body.

In the above-described ninth aspect, when the operator specifies the use purpose, the management track corresponding to the specified purpose is selected. Then, based on the management data that is included in the management track, a specific section of the content body is replayed. Thus, the operator of the distribution content creating apparatus can check how the distribution content will be replayed at the terminal side for each purpose.

A tenth aspect of the present invention is directed to a method of creating a distribution content including a content body which is provided with a use condition. The method of the tenth aspect includes:

a step of storing content bodies;

a step of creating a distribution content by reading a content body which is stored in the content body storing step and providing the content body with the use condition; and a step of storing the distribution content created in the distribution content creating step. Further, in the distribution content creating step, management data indicating the use condition for a specific section of the content body is edited, and the distribution content is created by providing the content body with at least one piece of the edited management data.

An eleventh aspect of the present invention is directed to a content distribution system that includes:

a distribution content creating apparatus for creating a distribution content including a content body which is provided with a use condition;

a distributing apparatus for distributing the distribution content which is created by the distribution content creating apparatus; and a terminal for receiving and using the distribution content which is distributed by the distributing apparatus, wherein The distribution content creating apparatus of the eleventh aspect includes:

content storage means for storing content bodies;

distribution content creating means for creating the distribution content by reading a content body from the content storage means and providing the content body with the use condition; and first distribution content storage means for storing the distribution content which is created by the distribution content creating means.

Further, the distribution content creating means includes management data editing means for editing management data indicating the use condition for a specific section of the content body, and the distribution content creating means creates the distribution content by providing the content body with at least one piece of the management data which is edited by the management data editing means.

The terminal of the eleventh aspect includes:

receiving means for receiving the distribution content which is distributed by the distributing apparatus;

second distribution content storage means for storing the distribution content received by the receiving means; and replay means for reading the distribution content from the second distribution content storage means, and replaying, based on the management data, the specific section of the content body.

A twelfth aspect of the present invention is directed to a terminal for receiving and using a distribution content including a content body, and management data indicating a use condition for a specific section of the content body. The terminal of the twelfth aspect includes:

receiving means for receiving the distribution content;

distribution content storage means for storing the distribution content which is received by the receiving means; and replay means for reading the distribution content from the distribution content storage means, and replaying, based on the management data, the specific section of the content body.

In the above-described twelfth aspect, at least one section which is specified by at least one piece of management data that is included in the distribution content is replayed according to the condition which is specified by the management data.

According to a thirteenth aspect of the present invention, in accordance with the twelfth aspect, the use condition which is indicated by the management data prohibits the use of the section that is specified by the management data, allows the use of the section that is specified by the management data for free, or allows the use of the section that is specified by the management data in return for payment of a predetermined fee. Further, according to the thirteenth aspect, the terminal further comprises billing means for billing based on the management data.

When the use condition allows the use of the section for free, the replay means replays the section, and when the use condition allows the use of the section in return for payment of the predetermined fee, the replay means replays the section after the billing means charges the fee.

In the above-described thirteenth aspect, each specific section of the content can be so set as to be prohibited from being used, or allowed to be used for free or upon payment of a fee. A particular section is replayed if it is allowed to be used for free. On the other hand, if a particular section is allowed to be used upon payment of a predetermined fee, such a section is replayed after the fee is charged.

According to a fourteenth aspect of the present invention, in accordance with the twelfth aspect, the management data further indicates a replay order of the section which is specified by the management data, and the replay means replays at least one section which is specified by the management data in the replay order that is indicated by the management data.

In the above-described fourteenth aspect, each section of the content body has a replay order set therein. The sections are replayed in a decreasing replay order.

According to a fifteenth aspect of the present invention, in accordance with the twelfth aspect, the distribution content further includes a plurality of pieces of management track data defining a collection of at least one piece of the management data indicating at least one section which is used for a predetermined purpose as one management track corresponding to the purpose. Further, the replay means selects one of the plurality of pieces of management track data that is included in the read distribution content and, based on at least one piece of the management data that is included in the management track defined by the management track data, replays at least one specific section of the content body.

In the above-described fifteenth aspect, when the user specifies the use purpose, the management track corresponding to the use purpose is selected. Then, based on at least one piece of management data that is included in the management track, at least one specific section of the content is replayed. Thus, by receiving the distribution content only once, it is possible to use the content body for various purposes, such as for trying part of the content body for free and then using the entire content body by paying the fee.

A sixteenth aspect of the present invention is directed to a distribution content that includes a content body, and at least one piece of management data, wherein the management data indicates a use condition for a specific section of the content body.

In the above-described sixteenth aspect, the content body is provided with the management data indicating a use condition for a specific section of the content body, thereby forming a distribution content. The terminal receives such distribution content, and replays the specific section of the content body based on the management data.

According to a seventeenth aspect of the present invention, in accordance with the sixteenth aspect, the use condition which is indicated by the management data prohibits the use of the section that is specified by the management data, allows the use of the section that is specified by the management data for free, or allows the use of the section that is specified by the management data in return for payment of a predetermined fee.

In the above-described seventeenth aspect, each specific section of the content can be so set as to be prohibited from being used, allowed to be used for free or allowed to be used upon payment of a fee. The terminal that receives the distribution content for use replays the section if the section is allowed to be used for free and, if the section is allowed to be used upon payment of a predetermined fee, replays the section after the fee is charged.

According to an eighteenth aspect of the present invention, in accordance with the sixteenth aspect, the management data further indicates a replay order of the section which is specified by the management data.

In the above-described eighteenth aspect, each section of the content body has a replay order set therein. The sections are replayed in a decreasing replay order.

In a nineteenth aspect of the present invention, in accordance with the sixteenth aspect, the distribution content further includes a plurality of pieces of management track data, wherein each piece of management track data defines a collection of at least one piece of the management data indicating at least one section which is used for a predetermined purpose as one management track corresponding to the purpose.

In the above-described nineteenth aspect, the content body is provided with a plurality of pieces of management track data respectively corresponding to various use purposes. When the user specifies the use purpose, the terminal that receives the distribution content for use selects the management track corresponding to the specified use purpose. Then, based on at least one piece of management data that is included in the management track, the terminal replays at least one specified section of the content body.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating the structure of a content distribution system according to one embodiment of the present invention;

FIG. 2 is a flowchart showing outlines of the operation of the content distribution system of FIG. 1;

DESCRIPTION OF THE PREFERRED EMBODIMENTS

Figure 3:
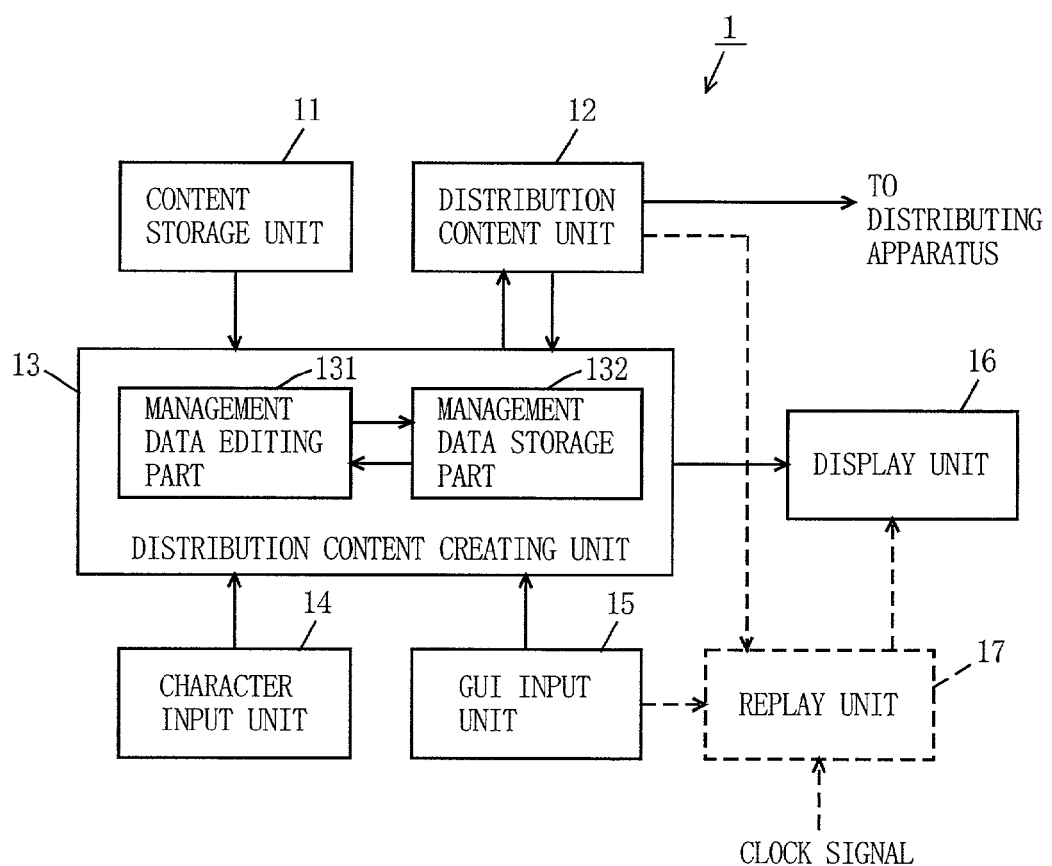
FIG. 3 is a block diagram illustrating the functional structure of a distribution content creating apparatus 1 of FIG. 1.

One embodiment of the present invention will now be described with reference to the drawings.

FIG. 1 is a block diagram illustrating the structure of a content distribution system according to one embodiment of the present invention. In FIG. 1, the present content distribution system includes a distribution content creating apparatus 1, a distributing apparatus 2, a network 3, and a terminal 4.

The distribution content creating apparatus 1 edits management data for a content body to be distributed, and provides the management data to the content body for creating a distribution content. Here, a "content body" is video such as a movie, or audio such as a piece of music. The "management data" is data indicating conditions for replaying the content body (the details of which are described later). The "distribution content" is a package including a content body which is provided with management data.

The distributing apparatus 2 distributes the distribution content through the network 3 to the terminal 4. The network 3 is a medium for transferring the distribution content from the distributing apparatus 2 to the terminal 4, and is implemented by, for example, a communications network such as the Internet or a portable phone network, or a broadcast network such as a satellite broadcast network.

The terminal 4 receives and replays the distribution content. At this time, the terminal 4 replays the content body based on the management data provided therewith. The terminal 4 is typically implemented by a general-purpose personal computer or a portable phone but, the terminal 4 may alternatively be a terminal which is dedicated to the present system.

With reference to a flowchart of FIG. 2, outlines of the operation of the above-structured content distribution system are described below.

FIG. 2 is a flowchart showing the outlines of the operation of the content distribution system of FIG. 1. In FIG. 2, the distribution content creating apparatus 1 stores content bodies, and edits management data for the respective content bodies on management tracks (step S1). Then, the distribution content creating apparatus 1 provides the management data which is edited in step S1 to the respective content bodies together with management track data for creating a packaged distribution content (step S2).

The distribution content which is created in the above-described manner is temporarily stored in the distribution content creating apparatus 1 (step S3). Then, the distribution content is replayed for checking at the distribution content creating apparatus 1 side (step S4). Then, the distribution content is forwarded to the distributing apparatus 2 (step S5).

The distributing apparatus 2 distributes the received distribution content through the network 3 to the terminal 4.

The terminal 4 receives the distribution content (step S6), and then stores the received distribution content (step S7). The terminal 4 then reads the distribution content in response to a user's instruction, and replays the content body by following the management data provided thereto (step S8).

The structure and operation of the distribution content creating apparatus 1 of FIG. 1 will now be described in detail (steps S1 to S4 of FIG. 2).

FIG. 3 is a block diagram showing the functional structure of the distribution content creating apparatus 1 of FIG. 1. In FIG. 3, the distribution content creating apparatus 1 includes a content storage unit 11, a distribution content storage unit 12, a distribution content creating unit 13, a character input unit 14, a GUI (graphical user interface) input unit 15, a display unit 16, and a replay unit 17. The distribution creating unit 13 includes a management data editing part 131 and a management data storage part 132.

The content storage unit 11 stores content bodies. The character input unit 14 receives a character input by an operator (user). The GUI input unit 15 receives a GUI input by the operator. The distribution content creating unit 13 reads a content body from the content storage unit 11, edits management data for the content body, and provides the edited management data to the content body for creating a distribution content.

Figure 10:
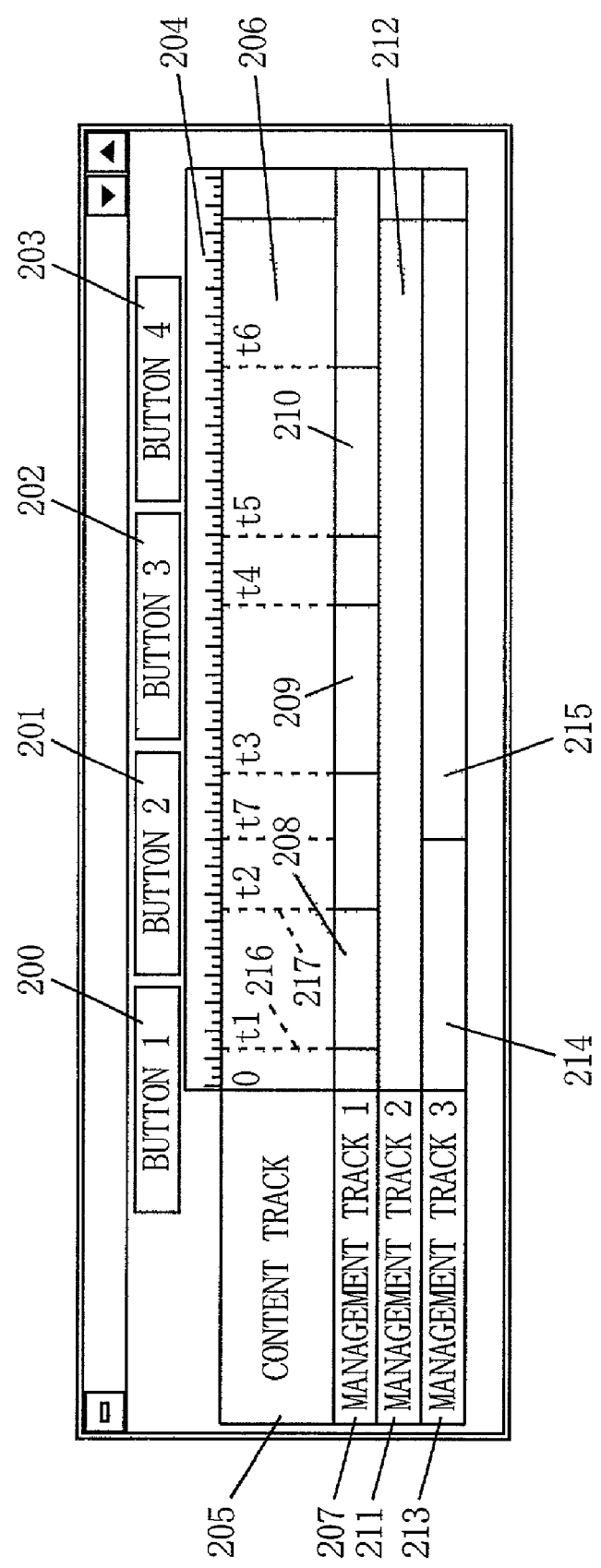
FIG. 10 is a diagram illustrating one example of a GUI screen that is displayed on a display unit 16 by following an instruction from a management data editing part 131 of FIG. 3.
Figures 11, 12:
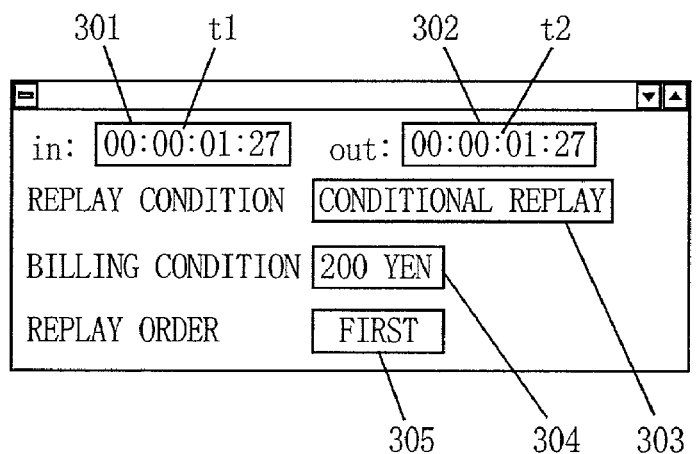
FIG. 11 is a diagram illustrating one example of a character input screen that is displayed on the display unit 16 by following an instruction from the management data editing part 131 of FIG. 3.
FIG. 12 is a diagram illustrating one example of a management data selection screen that is displayed on the display unit 16 by following an instruction from the management data editing part 131 of FIG. 3.

At this time, in the distribution content creating unit 13, the management data editing part 131 makes the display unit 16 display a screen for editing by GUI as shown in FIG. 10 (described later), a screen for character input as shown in FIG. 11 (described later), and a screen for management data selection as shown in FIG. 12 (described later). The management data editing part 131 then edits the management data in response to an input operation by the operator through the respective screens. The management data editing part 131 then stores the edited management data in the management data storage unit 132.

Assuming that the content body is used for a plurality of purposes, the distribution content creating unit 13 edits the management data on a plurality of management tracks corresponding to the respective purposes. The distribution content creating unit 13 then generates a plurality of pieces of management track data defining, as a management track, a collection of at least one piece of management data indicating at least one section which is used for the same purpose. The distribution content creating unit 13 then provides the management data and the management track data to the content body for creating a distribution content, and stores the created distribution content in the distribution content storage unit 12.

In other words, the distribution content (content body+ management track data+management data) which is created by the distribution content creating unit 13 is stored in the distribution content storage unit 12, and, in addition, the management data is separately stored in the management data storage part 132 of the distribution content creating unit 13.

Figure 4:
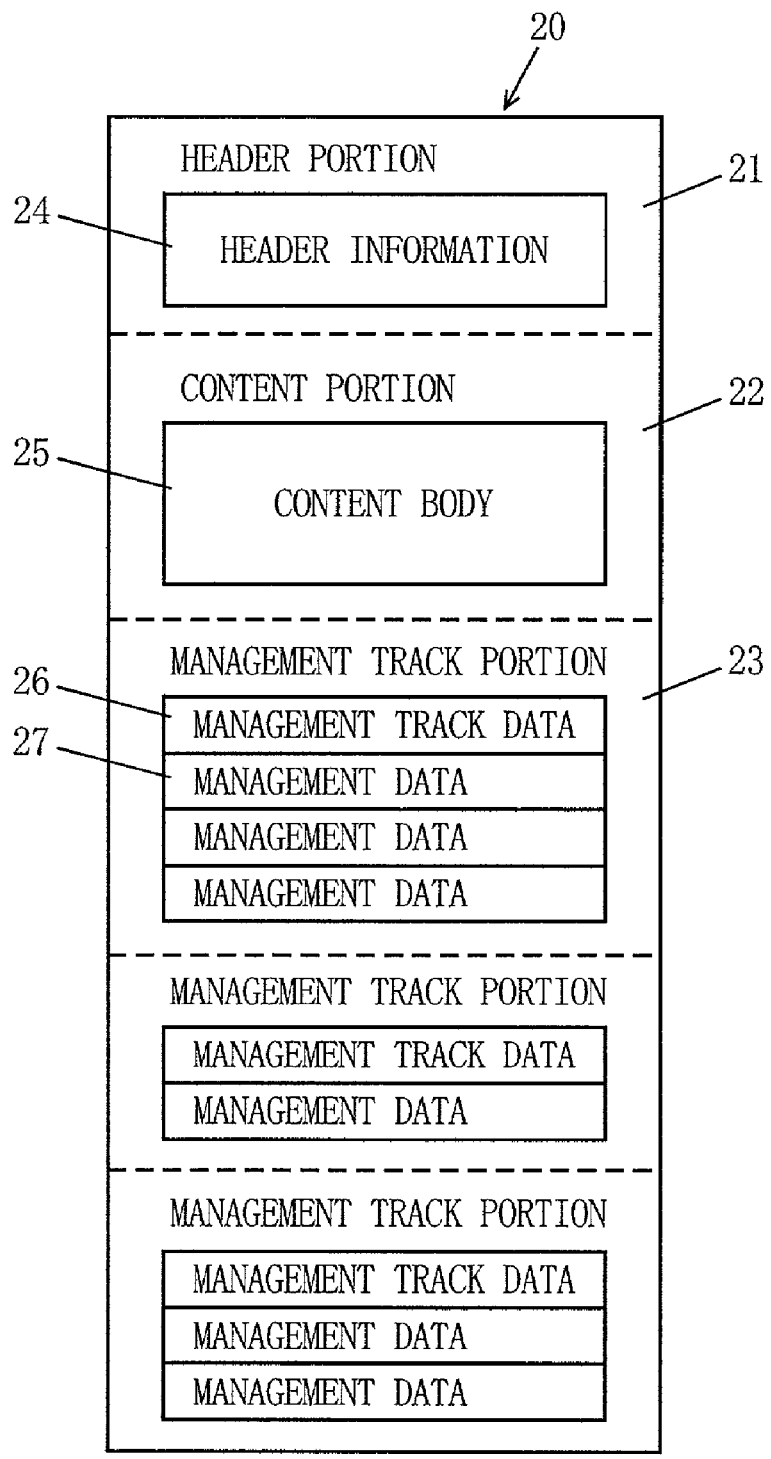
FIG. 4 is a diagram illustrating the data structure of a distribution content which is created by a distribution content creating unit 13 of FIG. 4.

The data structure of the distribution content will now be described. FIG. 4 is a diagram illustrating one example of the data structure of the distribution content which is created by the distribution content creating apparatus 1 of FIG. 1. In FIG. 4, a distribution content 20 includes a header portion 21, a content portion 22, and a plurality of management track portions 23. The header portion 21 includes header information 24 indicating the data structure of the distribution content 20. The content portion 22 includes a content body 25. Each management track portion 23 includes one piece of management track data 26 and one or more pieces of management data 27.

Figure 5:
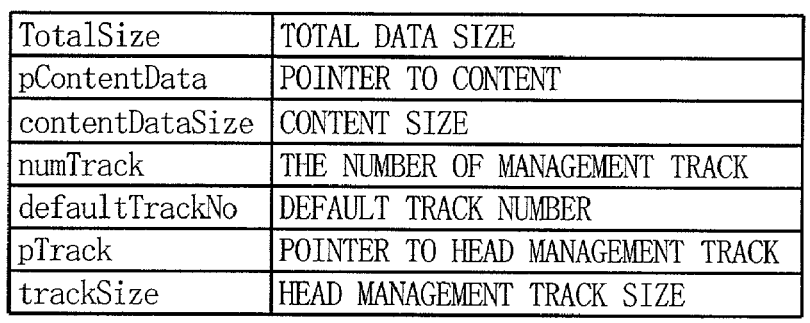
FIG. 5 is a diagram showing one example of header information which is included in a header portion of FIG. 4.

FIG. 5 is a diagram illustrating one example of the header information 24 which is included in the header portion 21 of FIG. 4. In FIG. 5, the header information 24 contains "totalSize" indicating the total data size of the distribution content 20, "pContentData" indicating a pointer to the content body 25, "contentDataSize" indicating the data size of the content body 25, "numTrack" indicating the number of management tracks, "defaultTrackNo" indicating a default track number, "pTrack" indicating a pointer to the head management track portion 23, and "trackSize" indicating the size of the head management track portion 23.

Figure 6:
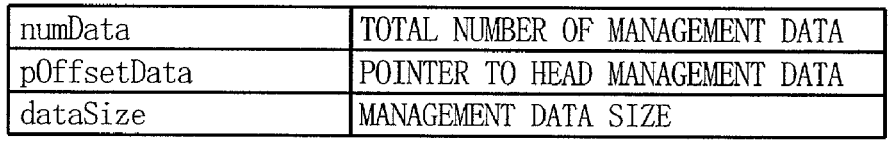
FIG. 6 is a diagram illustrating one example of management track data which is included in a management track portion of FIG. 4.
Figure 7:
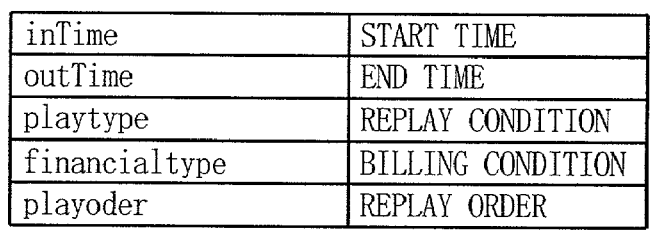
FIG. 7 is a diagram illustrating one example of management data which is included in the management track portion of FIG. 4.

FIG. 6 is a diagram illustrating one example of the management track data 26 which is included in the management track portion 23 of FIG. 4. In FIG. 6, the management track data 26 contains "numData" indicating the total number of pieces of management data 27 that are included in the management track portion 23, "pOffsetData" indicating a pointer to the header management data 27, and "dataSize" indicating the size of the management data FIG. 7 is a diagram illustrating one example of the management data 27 which is included in the management track portion 23 of FIG. 4. In FIG. 7, the management data 27 contains "in Time" indicating a start time, "outTime" indicating an end time, "playtype" indicating a replay condition, "finacialtype" indicating a billing condition, and "playorder" indicating a replay order.

Referring back to FIG. 3, the replay unit 17 is provided for checking how the distribution content which is created in the above-described manner will be replayed by the terminal 4. In response to an instruction by the operator through the GUI input unit 15, the replay unit 17 reads the distribution content from the distribution content storage unit 12 for replay, and outputs the read distribution content to the display unit 16.

Figure 8:
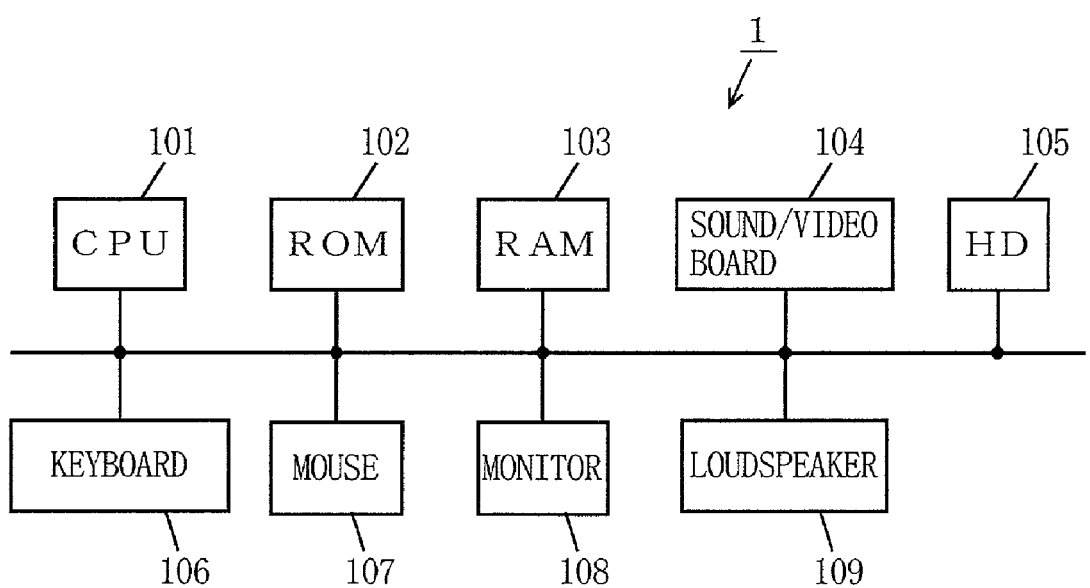
FIG. 8 is a block diagram illustrating one example of the hardware structure of the distribution content creating apparatus 1 of FIG. 1.

FIG. 8 is a block diagram illustrating one example of the hardware structure of the distribution content creating apparatus 1 of FIG. 1. In FIG. 8, the distribution content creating apparatus 1 includes a CPU 101, a ROM 102, a RAM 103, a sound/video board 104, a hard disk (HD) 105, a keyboard 106, a mouse 107, a monitor 108, and a loudspeaker 109.

In FIG. 3, the content storage unit 11 and the distribution content storage unit 12 are implemented by the hard disk 105; the character input unit 14 is implemented by the keyboard 106; the GUI input unit 15 is implemented by the mouse 107; and the display unit 16 is implemented by the monitor 108 and the loudspeaker 109.

The distribution content creating unit 13 is implemented by the CPU 101, the ROM 102, and the RAM 103. That is, upon receiving an instruction that is provided by the user through the keyboard 106 and/or the mouse 107, the CPU 101 operates by following predetermined content creating program data which is previously stored in the ROM 102. The RAM 103 is used as a working area when the CPU 101 operates.

The replay unit 17 is implemented by the CPU 101, the ROM 102, the RAM 103, and the sound/video board 104. That is, upon receiving an instruction that is provided by the user through the keyboard 106 and/or the mouse 107, the CPU 101 controls the sound/video board 104 by following a predetermined content replay program data which is previously stored in the ROM 102. The RAM 103 is used as a working area when the CPU 101 and the sound/video board 104 operate.

Here, the above-described content creating/replay program data may be provided as being stored in a portable recording medium such as CD-ROM, instead of being previously stored in the ROM 102. Alternatively, the program data may be provided to the distribution content creating apparatus 1 through the network. The program data provided as such is loaded in the hard disk 105, and is then forwarded to the RAM 103 at the time of content creation/replay.

Figure 9:
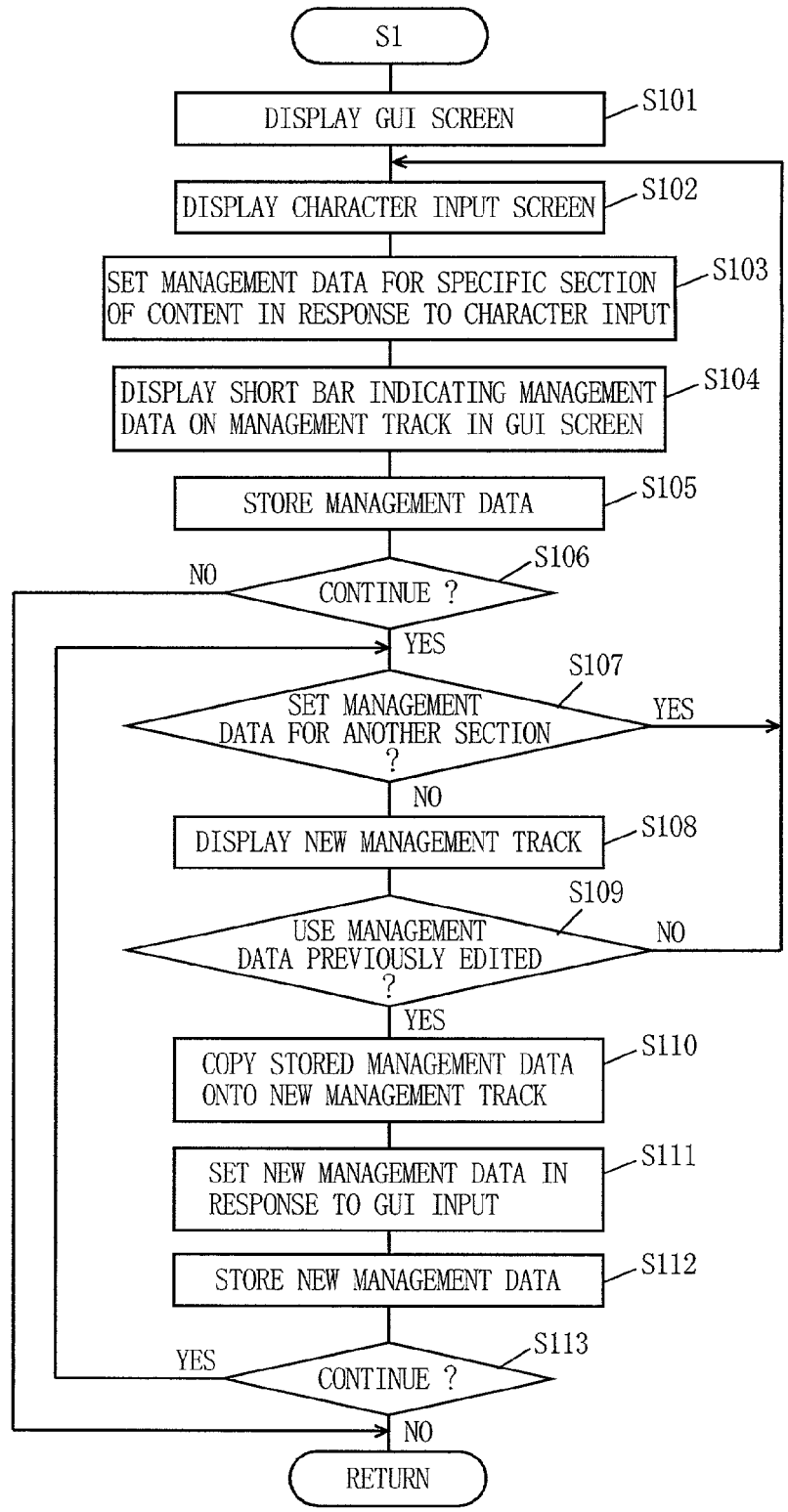
FIG. 9 is a flowchart showing a management data editing process (detailed process of step S1 in FIG. 2) which is carried out by the distribution content creating apparatus 1 structured as shown in FIG. 3.

FIG. 9 is a flowchart showing a management data editing process (a detailed process of step S1 in FIG. 2) which is carried out by the distribution content creating apparatus 1 structured as shown in FIG. 3.

In the distribution content creating apparatus 1, a plurality of content bodies are stored in the content storage unit 11. When the distribution content creating apparatus 1 is activated, the management data editing part 131 first makes the display 16 display a GUI screen such as the one shown in FIG. 10 (step S101).

Here, FIG. 10 is a diagram illustrating one example of the GUI screen which is displayed on the display 16 by following an instruction from the management data editing part 131 of FIG. 3. On the GUI screen of FIG. 10, a content track 205 and one or more management tracks are displayed along a time axis 204. At first, only one management track is displayed (here, "management track 1" 207), and then one or more new tracks are additionally displayed according to a request from the operator (here, "management track 2" 211, and "management track 3" 213). On the content track 205, a content body 206 is displayed as a bar having a length which is in proportion to its replay time. Also, on the content body 206, two separation lines (dotted lines 216 and 217 in FIG. 10) are displayed for defining a section. The separation lines 216 and 217 are moved in a direction of the time axis in response to an operation of the mouse 107 (GUI input unit 15) by the operator (in FIG. 10, the separation lines are positioned at t1 and t2, respectively).

On the management tracks 207, 211, and 213, short bars are displayed along the content body 206 which appears on the content track 205 based on management data corresponding to the section that is defined by the aforementioned separation lines. For example, on the "management track 1" 207, a short bar 208 is displayed based on management data for a section from t1 to t2 that is defined by the separation lines 216 and 217.

On an upper portion of the GUI input screen of FIG. 10, four buttons are displayed. When a "button 1" 200 is clicked, a character input screen as shown in FIG. 11 (described later) is further displayed on the display unit 16. When a "button 2" 201 is clicked, the two separation lines 216 and 217 are displayed on the content track 205, indicating start and end times, respectively, inputted though the above-described character input screen. When a "button 3" 202 is clicked, a new management track is additionally displayed. When a "button 4" 203 is clicked, a management data selection screen as shown in FIG. 12 (described later) is further displayed on the display unit 16.

When a GUI screen such as the one described above is displayed (presenting, at this moment, the four buttons 200 to 203, the time axis 204, and the content track 205), the operator clicks the "button 1" 200 through the GUI input unit 15. In response, the management data editing part 131 makes the display unit 16 display a character input screen such as the one shown in FIG. 11 (step S102).

FIG. 11 is a diagram illustrating one example of the character input screen which is displayed on the display unit 16 by following an instruction from the management data editing part 131 of FIG. 3. Displayed on the character input screen shown in FIG. 11 are a start time (in) field 301 and an end time (out) field 302 which each specify a section of the content body, a replay condition field 303 for entering a replay condition for the specified section, a billing condition field 304 for entering a billing condition for the specified section, and a replay order field 305 for entering a replay order of the specified section.

When a GUI screen such as the one described above is displayed, the operator enters desired times (for example, times t1 and t2) in the in field 301 and the out field 302, respectively, through the character input unit 14. Also, the operator enters desired conditions (for example, the operator enters "conditional replay" and "200 yen") in the replay condition field 303 and the billing condition field 304, respectively. That is, the section from t1 to t2 of the content body can be replayed if 200 yen is paid. Furthermore, the operator enters are play order (for example, "first" if the section should be replayed first) in the replay order field 305.

In response, the management data editing part 131 sets management data indicating the entered replay conditions (in this example, "first", "conditional replay", and "200 yen") for the section specified in the content body (in this example, the section from t1 to t2) (step S103).

The operator then clicks the "button 2" 201 on the GUI screen. In response, based on the management data indicating that replay conditions including "first", "conditional replay", and "200 yen" are set in the section from t1 to t2, the management data editing part 131 makes the short bar 208 be displayed in the section from t1 to t2 on the "management track 1" 207 of the GUI screen. The management data editing part 131 then stores the management data for the short bar 208 which is set in step S103 in the management data storage 132 (step S105).

Thus, one piece of management data which is represented by the short bar 208 has been set to the content body on the "management track 1" 207. If the operator desires to end the management data editing process, all he/she has to do is to give an instruction for ending the editing process. If the operator desires to set management data for another section on the "management track 1" 207, he/she again uses the GUI input unit 15, clicking the "button 1" 200 through to make the character input screen be displayed, and carries out the same setting process as described above. If the operator desires to set management data on the "management track 2" 211, he/she clicks the "button 3" 202 to display another "management track 2" 211 for carrying out the same setting process as described above.

The management data editing part 131 carries out a series of the following processes based on an input operation by the operator as described above. First, the management data editing part 131 determines whether to continue the editing process (step S106). If No in step S106, the editing process ends, and the procedure returns to the flowchart of FIG. 2 for steps S2 and thereafter.

If Yes in step S106, the management data editing part 131 determines whether to set management data for another section on the current management track (here, the "management track 1" 207) (step S107). If Yes in step S107, the procedure returns to step S102 for making the character input screen be displayed again on the display unit 16, and then repeats the process as in steps S103 to S107.

If No in step S107, the management data editing part 131 makes a new management track (here, the "management track 2" 211) be additionally displayed (step S108). Then, when editing the new management data on the "management track 2" 211 which is displayed in step S108, the management data editing part 131 determines whether to use the management data which was previously edited and stored in the management data storage part 132 (for example, the management data corresponding to the short bar 208 which was stored in step S105) (step S109).

If Yes in step S109, the management data that is stored in the management data storage part 132 is copied to the new management track (here, the "management track 2" 211) which is displayed in step S108 (step S110).

A management data copy process of step S110 is carried out as follows, for example. When the operator clicks the "button 4" 203 on the GUI screen, the management data editing part 131 makes a management data selection screen such as the one shown in FIG. 12 be displayed on the display unit 16.

FIG. 12 is a diagram showing one example of the management data selection screen which is displayed on the display unit 16 by following an instruction from the management data editing part 131 of FIG. 3. In FIG. 12, the management data selection screen includes a table containing a plurality of pieces of management data which were previously edited (208, 211, . . . ) and their details (start/end time, replay order, replay and billing conditions). When the operator clicks any desired management data for use (for example, the management data 208), the management data editing part 131 copies the bar representing the desired management data onto the "management track 2" 211 of the GUI screen (refer to FIG. 10), and also reads the details of the desired management data from the management data, storage part 132.

The operator then specifies the in and out times by using the GUI input unit 15 so as to move the ends of the bar representing the management data which is displayed on the "management track 2" 211. In response, the management data editing part 131 sets a new piece of management data (step S111). The management data editing part 131 then stores the new management data which is set through the GUI input unit 15 in the management data storage part 132 (step S112). The management data editing part 131 then determines whether to continue the editing process (step S113). If No in step S113, the editing process ends, and the procedure returns to the flowchart of FIG. 2 for step S2 and thereafter.

If Yes in step S113, the procedure returns to step S107 for determining whether to set management data for still another section on the "management track 2" 211.

If No in step S109, the procedure returns to step S102 for making the character input screen be displayed again on the display unit 16, and repeats the process of steps S103 to S109.

When the management data editing part 131 ends editing one or more pieces of management data on the respective management tracks, the distribution content creating apparatus 2 executes step S2 of FIG. 2.

In step S2 of FIG. 2, the distribution content creating apparatus 1 generates management track data for defining a collection of one or more pieces of management data as a management track. The generated data of a plurality of management tracks and the management data that is edited by the management data editing part 131 are provided to the content body for creating a packaged distribution content.

In the next step S3, the distribution content creating apparatus 1 temporarily stores the above-created distribution content in the distribution content storage unit 12. Note that the management data which were previously edited and stored in the management data storage part 132 are used as required when the management data for another content is edited.

The distribution content creating apparatus 1 then carries out the process in the above-described step S4 (refer to FIG. 2), that is, the distribution content replay process for checking the above-created distribution content.

Figure 13:
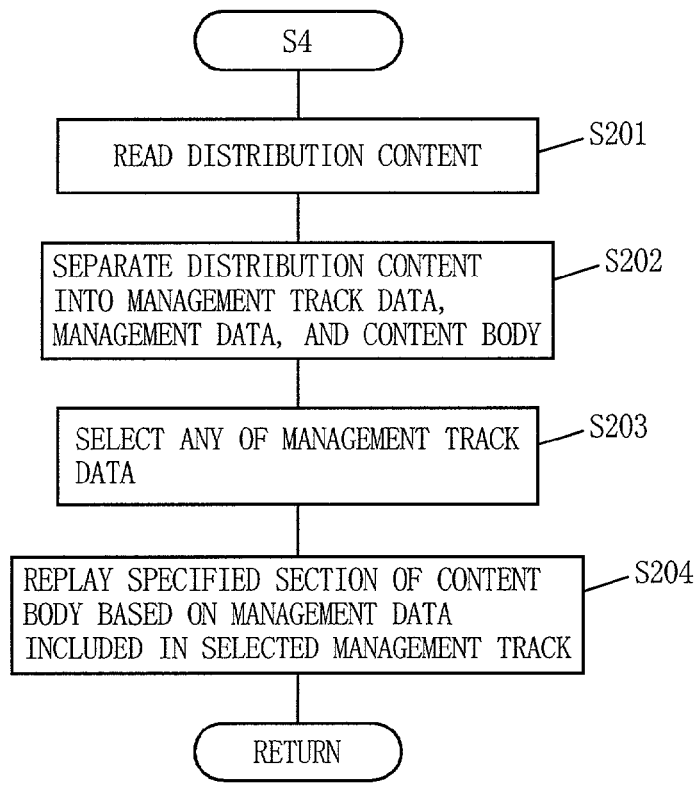
FIG. 13 is a flowchart showing a distribution content replay process (detailed process of step S4 in FIG. 2) which is carried out by the distribution content apparatus 1 structured as shown in FIG. 3.

FIG. 13 is a flowchart showing the distribution content replay process (details of step S4 in FIG. 2) which is carried out by the distribution content creating apparatus 1 structured as shown in FIG. 3.

In FIG. 13, the replay unit 17 first reads the distribution content from the distribution content storage unit 12 in response to an instruction from the operator through the GUI input unit 15 (step S201). Then, the replay unit 17 separates the read distribution content into the management track data, the management data, and the content body (step S202).

After the operator specifies any one of the management tracks through the GUI input unit 15, the replay unit 17 reads the management track data corresponding to the specified track (step S203). Then, by following a clock signal, the replay unit 17 replays a specific section of the content body based on the management data which is included in the specified management track (step S204). The procedure then returns to the flowchart of FIG. 2.

Here, the content replay process of the above-described step S204 is carried out as follows, for example. The content body is provided with a plurality of pieces of management track data that respectively correspond to different use purposes (for example, for a promotion purpose and a full-package purpose; described later) (refer to the management tracks 207 and 211 of FIG. 10). Therefore, the operator sequentially selects management tracks corresponding to a desired use purpose by using the GUI input unit 15. In response, the replay unit 17 replays the sections that are included in the content body and specified by the management data which is included in the selected management track in the order also specified by the management data.

Thus, when the content body is distributed for a promotion purpose or a full-package purpose, the operator of the distribution content creating apparatus 1 can check, for example, how the content body will be replayed by the terminal 4.

Each piece of management data includes the replay order, replay/billing conditions, and start and end times defining a section to which the aforementioned conditions are applied. Based on the clock signal that is given by the CPU 101 of FIG. 8, for example, and the above-described replay order and start and end times, the replay unit 17 specifies the replay order in the content body and the section to which the replay/billing conditions are applied. Based on the specified replay order and replay/billing conditions, the replay unit 17 replays the section.

Note that the replay unit 17 of the distribution content creating apparatus 1 does not replay a section for which the user has to pay a fee which is specified by the management data. Such a section is replayed by the terminal 4 after the fee is charged (described later).

For example, if the section from t1 to t2 of the content body is provided with a condition such as that the section cannot be replayed until 200 yen is paid, the terminal 4 side replays this section after billing is actually made. On the other hand, the creating apparatus 1 does not charge the terminal for the section or replay the section. Alternatively, the distribution content creating apparatus 1 may replay the section regarding as if the fee is paid or as if the fee is not paid.

The structure and operation of the terminal 4 of FIG. 1 will now be described in detail.

Figure 14:
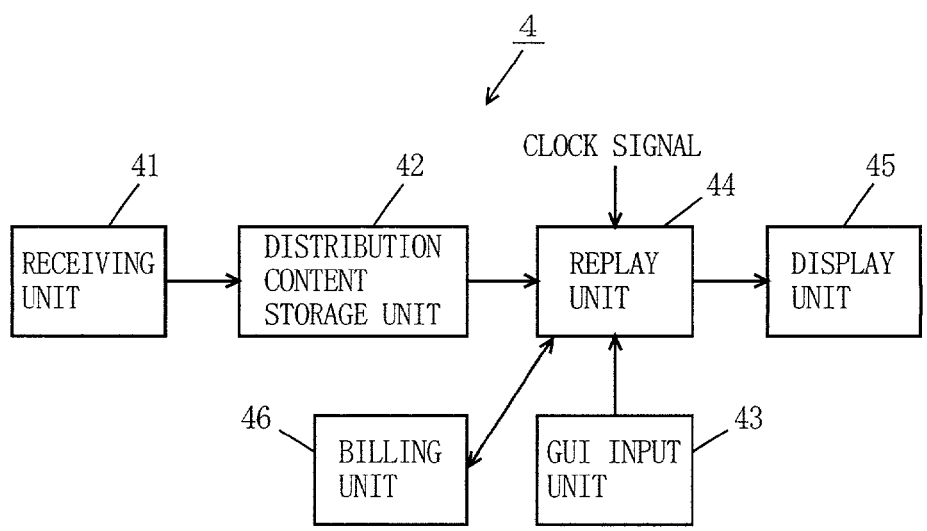
FIG. 14 is a block diagram illustrating one example of the structure of a terminal 4 of FIG. 1.

FIG. 14 is a block diagram illustrating the structure of the terminal 4 of FIG. 1. In FIG. 14, the terminal 4 includes a receiving unit 41, a distribution content storage unit 42, a GUI input unit 43, a replay unit 44, a display unit 45, and a billing unit 46.

The receiving unit 41 receives a distribution content through the network 3. The distribution content storage unit 42 stores the distribution content which is received by the receiving unit 41. The GUI input unit 43 receives a GUI input from the user. The replay unit 44 is used for the user to view the distribution content in the above-described above described manner. In response to an instruction that is made by the user through the GUI input unit 43, the replay unit 3 reads the distribution content from the distribution content storage unit 12 for replay, and outputs the read distribution content to the display unit 45. The billing unit 46 charges a bill of a predetermined amount to the user for the operation of the replay unit 44.

Note that the hardware structure of the terminal 4 is similar to that shown in FIG. 8.

Figure 15:
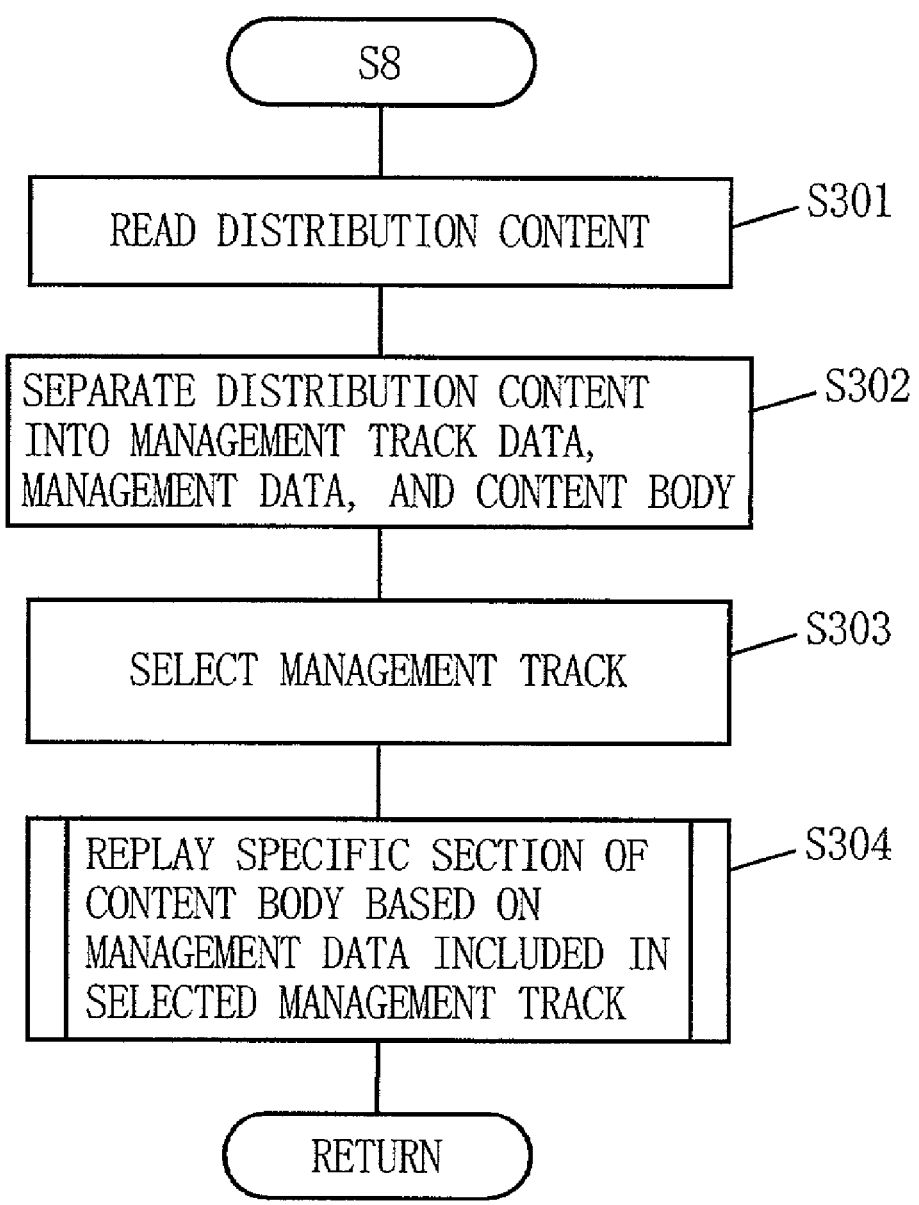
FIG. 15 is a flowchart showing a distribution content replay process (detailed process of step S8 in FIG. 2) which is carried out by the terminal 4 structured as shown in FIG. 14.

In the above-structured terminal 4, the distribution content replay operation is carried out by the replay unit 44 as follows. FIG. 15 is a flowchart showing the distribution content replay process (a detailed process of step S8 in FIG. 2) which is carried out by the terminal 4 structured as shown in FIG. 14.

In FIG. 15, in response to an instruction that is given by the user through the GUI input unit 43, the replay unit 44 first reads a distribution content from the distribution content storage unit 42 (step S301). The replay unit 44 then separates the read distribution content into management track data, management data, and a content body (step S302).

After receiving an instruction indicating a management track that is specified by the user through the GUI input unit 43, the replay unit 44 reads the management track data corresponding to the specified track (step S303). Based on the management data which is included in the specified management track, the replay unit 44 replays a specific section of the content body by following a clock signal (step S304). The procedure then returns to the flowchart of FIG. 2.

As such, the operation of the replay unit 44 which is included in the terminal 4 is similar to that of the replay unit 17 which is included in the distribution content creating apparatus 1 (refer to the flowchart of FIG. 13). However, the terminal 4 side is different from the distribution content creating apparatus 1 side in part of the content replay program that is stored in the ROM 102 shown in FIG. 8. In step S304, a bill is charged accompanying to the replay.

Figure 16:
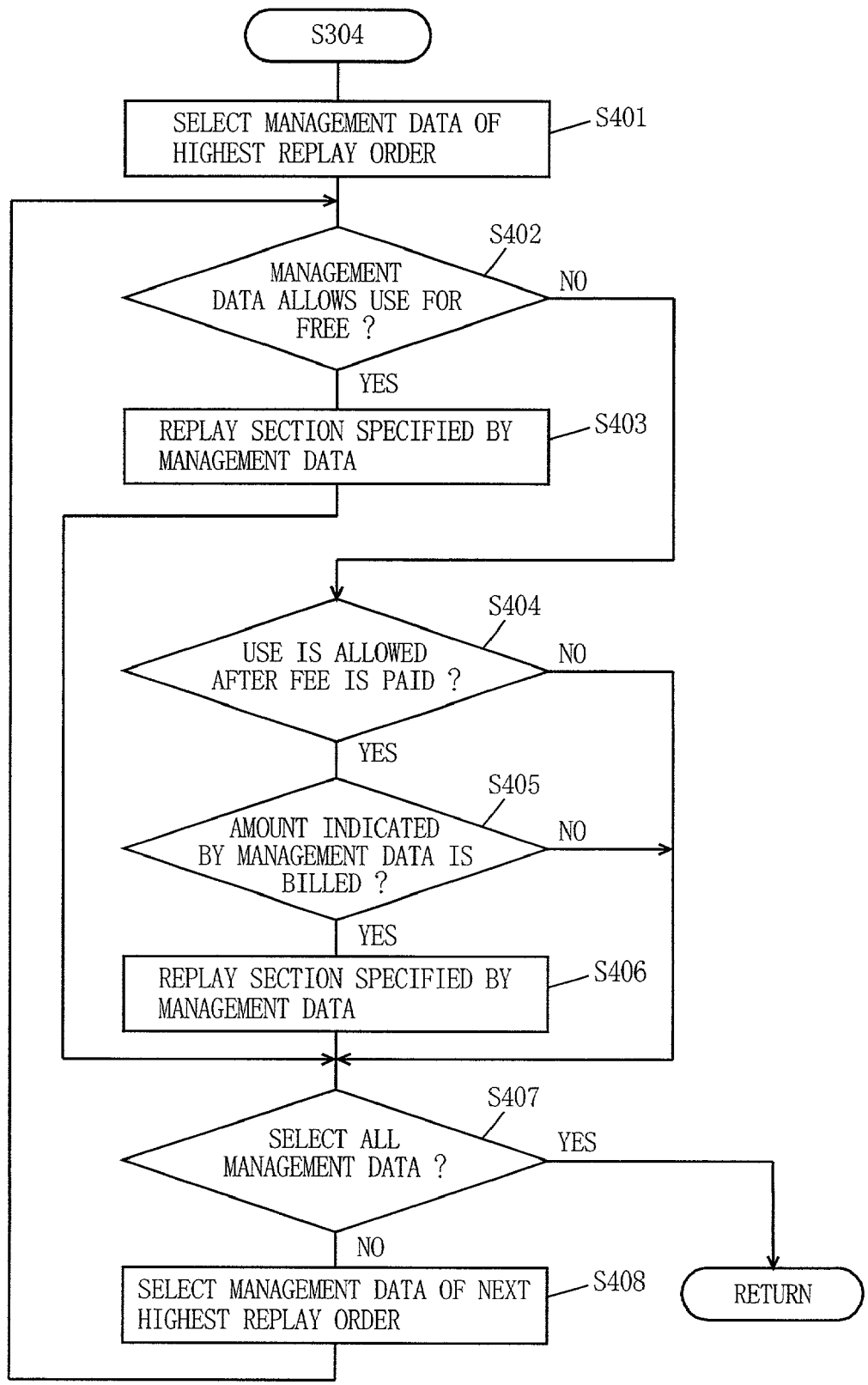
FIG. 16 is a flowchart showing a detailed process of step S304 of FIG. 15.

FIG. 16 is a flowchart showing the detailed content replay process of step S304 in FIG. 15. In FIG. 16, the replay unit 44 first selects management data of the highest replay order from the management data that is included in the specified management track (step S401). The replay unit 44 then determines whether the management data which is selected in step S401 allows for the use of a specific section for free (step S402). If No in step S402, the procedure goes to step S404.

If Yes in step S402, the replay unit 44 replays the section specified by the management data which is selected in step S401 (step S403). The procedure then goes to step S407.

In step S404, the replay unit 44 determines whether the management data which is selected in step S401 allows for the replay of the specific section in return for payment. If No in step S404, the procedure goes to step S407.

If Yes in step S404, the replay unit 44 notifies the billing unit 46 of the amount indicated by the management data which is selected in step S401, and then determines whether the indicated amount has been charged by the billing unit 46 (step S405). If No in step S405, the procedure goes to step S407.

Here, the above-described billing process is carried out as follows, for example. The billing unit 46 accesses a host computer in a financial institution through the network 3, and transfers a specific amount from a user's account to a distributor's account. Alternatively, the billing unit 46 may deduct the specific amount from a prepaid card which was previously purchased by the user, or record the specific amount and charge the amount later on a predetermined date.

Referring back to FIG. 16, if Yes in step S405, the replay unit 44 replays the section specified by the management data which is selected in step S401 (step S406). The procedure then goes to step S407.

In step S407, it is determined whether all of the management data which are included in the specified management track have been selected. If Yes in step S407, the procedure returns to the flowchart of FIG. 15.

If No in step S407, the replay unit 44 selects management data of the next highest replay order from the management data which is included in the specified management track (step S408). The procedure then returns to step S402, repeating the operation similar to the one described above.

As clearly described above, the significant features of the distribution content creating process of the present invention can be categorized into the following six points. First, unlike the conventional one-to-one correspondence between the content body and the management data, the content body is divided into a plurality of sections on the time axis, and each section can be provided with different management data. In other words, it is possible to specify a section in the content body, and to set management data to only be effective to that section. This enables different replay conditions to be set to the respective sections. For example, a content body can be replayed only for the first few minutes, or can be replayed for free only for the first few minutes but the rest of the content body can not be replayed unless a fee is paid.

Figure 17:
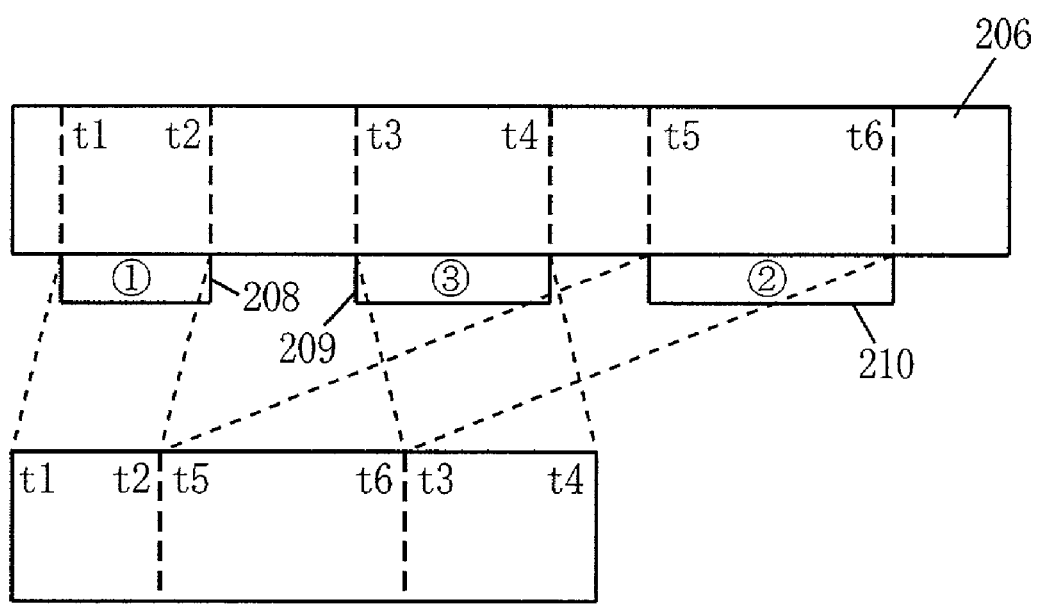
FIG. 17 is a diagram showing how a replay unit 44 replays data for respective sections in the order which is specified by management data 208 to 210.

Second, each management data includes a replay order, and therefore, the order of replaying the sections can be arbitrarily changed. For example, the three pieces of management data 208 to 210 on the "management track 1" 207 of FIG. 10 includes "first", "third", and "second", respectively. In this case, as shown in FIG. 17, the section from t1 to t2 in the content body 206 is first replayed, then the section from t5 to t6 is replayed, and then, the section from t3 to t4 is replayed.

Third, a plurality of tracks (207, 211, 213) are provided for the content track 205 on the GUI screen, thereby enabling different pieces of management data to be set for the same section of the content body. Thus, it is possible to obtain a distribution content whose content body can be used in a plurality of purposes. Specifically, a single content body can be distributed for a promotion purpose where the content body can be replayed only for a first few minutes for free and, at the same time, for a full-package purpose where the entire content body can be replayed.

As a result of achieving such distribution content including a single content body for a plurality of purposes, the storage amount of the distribution content storage units 12 and 42 of the distribution content creating apparatus 1 side and the terminal 4 side, respectively, can be saved. Also, communications costs for distribution can be reduced. Furthermore, in the terminal 4 side, receiving only one distribution content is enough for the user to use the content body as he/she likes. Conventionally, the user has to receive two distribution contents, the promotion one and the full-package one, if he/she wants to try the content before purchasing such content. In the present invention, the terminal 4 receives a distribution content, and then selects a management track by following a user's instruction. The terminal 4 then replays, in the order specified by the management data which is included in the selected management track, the sections also specified by the management data.

Fourth, the operator of the distribution content creating apparatus 1 can check how the distribution content will be replayed at the terminal 4 side. When a single distribution content is used for a plurality of purposes (two purposes, for example, a promotion purpose and a full-package purpose), it is possible to check how such distribution content will be replayed when used for the respective purposes.

Fifth, for editing management data, not only character inputs but also GUI inputs can be made. This greatly reduces the operator's workload.

Sixth, the management data which was previously edited is stored, and can be used for editing new management data. This further reduces the operator's workload for editing.

Specific examples of the distribution content creation operation which is carried out by the distribution content creating apparatus 1 will now be described.

FIRST EXAMPLE

With reference to FIGS. 3, 10, 11, and 17, described below is a case of creating a promotion distribution content that is partly viewable for free. In the content storage unit 11 such as the hard disk 105, content bodies such as video data and music data are previously stored. The operator first selects a content body to be distributed from the stored content bodies. The selected content body is made to be displayed by the management data editing part 131 as the bar 206 which is placed on the content track 205 along the time axis 204 so that one end of the bar is placed at the origin of the time axis 204 in the GUI screen which is displayed on the display unit 16 (refer to FIG. 10).

The operator then operates the GUI input unit 15 such as the mouse 107 by clicking the "button 3" 202 on the GUI screen so as to display the "management track 1" for placing the management data. Furthermore, the operator clicks the "button 1" 200 for displaying the character input screen as shown in FIG. 11, and inputs use conditions at the time of content distribution. In this example, "unconditional replay" is inputted as the replay condition, "free" is inputted as the billing condition, and "first" is inputted as the replay order. Furthermore, to specify a section of the content body to which the use condition is effective, an effective period is defined by the start time t1 and the end time t2, which are offset times from the replay start time of the content body. Based on the inputted management data, the bar 208 with its left end at the start time t1 and its right end at the end time t2 is displayed on the "management track"1" 207.

In response to the operator's mouse 107 (GUI input unit 15) operation, the management data editing part 131 edits the start and end times of the management data by extending/shortening, in the time axis (lateral) direction, the bar 208 representing the inputted management data. Then, when the operator inputs "unconditional replay", "free", t3 for the start time and t4 for the end time, and "third", the management data editing part 131 places a bar representing the inputted management data on an area between t3 and t4 of the "management track 1" 207. Furthermore, when the operator inputs "unconditional replay", "free", t5 for the start time and t6 for the end time, and "second", the management data editing part 131 places a bar 210 representing the inputted management data on an area between t5 and t6 of the "management track 1" 207. Then, the management data editing part 131 stores the edited management data which is represented by the bars 208, 209, and 210 in the management data storage part 132. Note that, in the present example, portions where no management data is arranged on the "management track 1" 207 cannot be replayed.

The edited content management data represented by the bars 208, 209, and 210 are packaged together with the content body, and stored in the distribution content storage unit 12 as a distribution content. The replay unit 17 then reads only data of the sections which are indicated by the management data corresponding to the bars 208, 209, and 210 as being replayable from the distribution content that is stored in the distribution content storage unit 12. Then, as shown in FIG. 17, data reproduction for the respective sections are carried out in the order as specified by the management data 208, 209, and 210, and the reproduction results are outputted to the display unit 16.

As such, in the present example, the management data is provided with the start time and the end time, thereby placing a plurality of pieces of management data on the same management track and editing these on the time axis. Thus, it is possible to easily create a distribution content such as one whose content body is intermittently replayed for a plurality of sections (for example, in a movie, only highlight scenes are replayed), which is typified by a promotion distribution content. Also, the management data is provided with the replay order, thereby replaying these sections (highlight scenes) in a desired order.

SECOND EXAMPLE

With reference to FIGS. 3, 10 and 11, described below is a case of creating a full-packaged distribution content whose entire content can be replayed upon the payment of a fee. In the present example, the distribution content having the management data for the promotion purposes created in the first example is provided with management data for a full-package purpose.

The operator first selects the distribution content (created in the above-described embodiment) which is stored in the distribution content storage unit 12. Based on the selected distribution content, the bar 206 is placed on the content track 205 on the GUI screen as shown in FIG. 10. Furthermore, the bars representing the promotion management data 208, 209, and 210 are displayed on the "management track 1" 207.

The operator then uses the GUI input unit 15 by clicking the "button 3" 202 on the GUI screen through so as to display a new "management track 2" 211 for placing a bar representing the management data for the full-package purpose below the "management track 1" 207. The operator clicks "button 1" 200 on the GUI screen in the similar manner as that in the first example for making the character input screen (refer to FIG. 11) be displayed on the display unit 16, and inputs replay conditions in the respective fields. Since the distribution content is for the full-package purpose in this example, the operator inputs "conditional replay" as the replay condition, a fee ("200 yen", for example) as the billing condition, and the start time (0) and the end time (end). Based on the inputted management data, a bar 212 which is defined by the start and end times is displayed on the "management track 2" 211.

The full-package management data that is represented by the bar 212 and edited in the above-described manner is added to the distribution content (including the content body, and the promotion management data represented by the bars 208, 209, and 210) created in the first example, and the resulting distribution content is stored in the distribution content storage unit 12.

The operator then uses the GUI input unit 15 to double-click the "management track 2" 211 where the full-package management data (bar 212) is placed on the GUI screen. In response, the replay unit 17 reads the above-described distribution content which is stored in the distribution content storage unit 12 so as to replay the content body by following the full-package management data. Note that the terminal 4 side cannot replay the distribution content unless the fee is actually paid. The creating apparatus 1 side, however, preferably replays the content body as if the fee is paid and not paid so as to check whether the above-created distribution content will be replayed correctly by following the management data or for just trying the distribution content so as to check such distribution content.

As such, in the present example, a plurality of management tracks (207, 211, and 213) are provided for the single content track 205 on the GUI screen. Therefore, a plurality of pieces of management data corresponding to the respective use purposes can be set to a single content body. Such plurality of pieces of management data may include, for example, the promotion management data corresponding to the bars 208 to 210, and the full-package management data corresponding to the bar 212. Thus, it is possible to edit the plurality of pieces of management data corresponding to the respective use purposes on the same screen, thereby enabling the operator to efficiently edit the management data.

Also, the plurality of pieces of management data are provided to a single content body to form a package, and the package is stored as a single distribution content. Therefore, the storage amount of the distribution content storage unit 12 can be saved. Note that, in the conventional apparatuses and methods, when a single content body is distributed for a promotion purpose and a full-package purpose, two distribution contents have to be stored, one content including the content body and promotion management data and the other content including the content body and full-package management data. Thus, the same content body has to be redundantly stored, thereby wasting the storage amount.

THIRD EXAMPLE

With reference to FIGS. 3, 10 and 11, described below is a case of creating a distribution content including a content body which is partly provided as a visual effect such as a mosaic and which is incapable of being viewed without the visual effect unless a fee is paid (in other words, the user can see only the video with the mosaic if the fee is not paid, but if paid, can see the video with the mosaic removed therefrom). Such distribution content is hereinafter referred to as a full package with visual effects. In the present example, the distribution content having two pieces of management data, promotion and full-package, as created in the second example, is further provided with management data for the full package with visual effects.

Similar to the second example, the operator first selects the distribution content which is stored in the distribution content storage unit 12. The selected distribution content is shown as the bar 206 on the content track 205 of the GUI screen (refer to FIG. 10). Also, the promotion management data which are represented by the bars 208, 209, 210 are shown on the "management track 1" 207, and the full-package management data which is represented by the bar 212 is shown on the "management track 2" 211.

The operator then uses the GUI input unit 15 by clicking the "button 3" 202 on the GUI screen so as to make a new "management track 3" 213 be displayed for the management data for the full package with visual effect. In a similar manner to that in the first example, the operator then clicks the "button 1" 200 on the GUI screen for making the character screen (refer to FIG. 11) be displayed on the display unit 16, and inputs replay conditions for the respective fields. In this case, the distribution content is a full package with visual effects, meaning that a fee is charged only for a section with the visual effects. Therefore, for the section with visual effects, the operator inputs "conditional replay; visual effects removed" as the replay condition, a fee ("200 yen", for example) as the billing condition, and also the start time (0) and the end time (t7) of that section. Furthermore, for the remaining section, that is, the section without visual effects, the operator inputs "unconditional" as the replay condition, "free" as the billing condition, and also the start time (t7) and the end time (end) of that remaining section. Based on the inputted management data, bars 214 and 215 which are each defined by the start time and the end time are displayed on the "management track 3" 213.

The above-edited management data for the full package with visual effects represented by the bars 214 and 215 are added to the distribution content (including the content body, the promotion management data represented by the bars 208, 209 and 210, and the full-package management data represented by the bar 212) as created in the second example, and the resulting distribution content is stored in the distribution content storage unit 12.

The operator then uses the GUI input unit 15 by clicking the "management track 3" 213 where the bar representing the management data for the full package with visual effects is placed on the GUI screen. In response, the replay unit 17 reads the above-described distribution content from the distribution content storage unit 12 so as to replay the content body by following the management data which are represented by the bars 214 and 215 for the full package with visual effects. Note that the terminal 4 side cannot replay the distribution content without the visual effects unless the fee is actually paid. The creating apparatus 1 side, however, replays the content body as if the fee is paid (a replay with the visual effects) and not paid (a replay with the visual effects) so as to check whether the above-created distribution content will be replayed correctly by following the management data or for just trying the distribution content so as to check such distribution content.

As such, in the present example, the content body is partly provided with visual effects such as a mosaic, and is then provided with management data which is edited for replaying the entire content body without the visual effects after the fee is paid. The distribution content creating apparatus 1 can arbitrarily increase the number of pieces of management data that are provided to the content body, thereby achieving various use purposes.

FOURTH EXAMPLE

With reference to FIGS. 10 and 12, described below is a case of reusing the management data previously edited and stored for one distribution content so as to create another distribution content. In this example, the promotion management data edited in the first example and stored in the management data storage part 132 is reused.

The content storage unit 11 stores a plurality of content bodies including the content body which is distributed in the first example. The management data storage part 132 stores the management data 208 which is edited in the first example.

The operator first selects a content body for distribution, which is different from the content body distributed in the first example. Based on the selected content body, the bar 206 is displayed on the content track 205 in the GUI screen (refer to FIG. 10) which is displayed on the display unit 16.

The operator then uses the GUI input unit 15 such as the mouse 107 to click the "button 3" 202 on the GUI screen so as to make the "management track 1" 207 be displayed for placing the bar representing the management data. The operator also clicks the "button 4" 203 so as to make a table as shown in FIG. 12 be displayed, where the table contains data (management data which was previously edited) stored in the management data storage part 132. The operator then clicks the management data corresponding to the bar 208 which is edited in the first example on that table for selection. The selected management data corresponding to the bar 208 is copied to the "management track 1" 207, and another bar is displayed thereon based on the copied management data.

Note that, in the first example, the operator clicks the "button 1" 200 to make the character input screen be displayed as shown in FIG. 11, and inputs use conditions at the time of content distribution. In the fourth example, such character input can be omitted.

As described above, in the present example, in addition to the distribution content (including the content body, the management track data, and the management data), only the management data is stored in the management data storage unit 132, and reused at the time of creating another distribution content. Thus, character inputs such as the start and end times and replay conditions can be omitted.

Note that, in the first example, portions where no management data is provided on the "management track 1" 207 cannot be replayed. Alternatively, such portions may be provided with management data indicating "unreplayable".

Also, in each of the above-described examples, the management data is composed of the start time, the end time, the replay condition, the billing condition, and the replay order. In addition, a copy condition may be provided for indicating whether the distributed content body can be copied from the distribution content storage unit 42 of the terminal 4 to the hard disk 105, for example, of another terminal 4.

While the present invention has been described in detail, the foregoing description is in all aspects illustrative and not restrictive. It is to be understood that numerous other modifications and variations can be devised without departing from the scope of the present invention.

What is claimed is:

1. A distribution content creating apparatus comprising:
   a content storage part operable to store content bodies;
   a distribution content creating part operable to create a distribution content by reading a content body from said content storage part and providing the read content body with a use condition; and
   a distribution content storage part operable to store the distribution content created by said distribution content creating part; wherein:
   said distribution content creating part includes a management data editing part operable to edit management data for at least one specific section of the read content body indicating the use condition of the specific section;
   the specific section of the read content body is at least one of a plurality of sections on a time axis constituting the read content body;
   said distribution content creating part is further operable to create the distribution content by providing the content body with a plurality of pieces of management data edited by said management data editing part and with management track data which defines, as a management track, a collection of at least one management data selected from the plurality of pieces of management data; and
   a plurality of management tracks are defined in the distribution content corresponding to a plurality of different uses of the content body, and the plurality of different uses are different in terms of at least one of a reproduction section of the content body and a reproduction condition of the content body.

2. The distribution content creating apparatus according to claim 1, wherein the use condition indicated by the management data prohibits use of the section specified by the management data, allows the use of the section specified by the management data for free, or allows the use of the section specified by the management data in return for payment of a predetermined fee.

3. The distribution content creating apparatus according to claim 1, wherein the management data further indicates a replay order of the section specified by the management data.

4. The distribution content creating apparatus according to claim 1, further comprising:
   a character input part operable to supply a character input to said distribution content creating unit; and
   GUI input part operable to supply a GUI input to said distribution content creating unit; wherein:
   said management data editing part is further operable to make a GUI screen be displayed, the GUI screen including a plurality of management tracks provided along a time axis;
   said management data editing part is further operable to edit the management data of the specific section by receiving, through said character input part, a start time and an end time for defining the specific section of the content body on the time axis, and the use condition for one of the plurality of different uses; and
   said management data editing part is further operable to place, based on the edited management data, a bar on the management track corresponding to one of the plurality of different uses in the GUI screen.

5. The distribution content creating apparatus according to claim 4, wherein said distribution content creating part further includes a management data storage part operable to store the management data edited by said management data editing part.

6. The distribution content creating apparatus according to claim 5, wherein
   said management data editing part is further operable to read the management data previously edited from said management data storage part, and to place, based on the read management data, a bar on the management track in the GUI screen, and said management data editing part is further operable to edit the management data by moving at least one end of the bar along the time axis through an operation by said GUI input part.

7. The distribution content creating apparatus according to claim 1, wherein said distribution content creating part further includes a replay part operable to read the distribution content from said distribution content storage part and to replay, based on the management data, the specific section of the content body.

8. The distribution content creating apparatus according to claim 7, wherein said replay part is further operable to select one of the plurality of pieces of management track data included in the read distribution content and, based on at least one piece of the management data included in the management track defined by the management track data, to replay at least one specific section of the content body.

9. A method of creating a distribution content including a content body provided with a use condition, said method comprising:

storing content bodies;

creating a distribution content by reading a content body stored in said storing of the content bodies and providing the read content body with the use condition; and storing the distribution content created in said creating of the distribution content;

wherein in said creating of the distribution content
management data for at least one specific section of the read content body indicating the use condition of the specific section is edited,
the specific section of the read content body is at least one of a plurality of sections on a time axis constituting the read content body, and
the distribution content is created by providing the read content body with a plurality of pieces of the edited management data and with management track data which defines, as a management track, a collection of at least one of the management data selected from the plurality of pieces of management data; and wherein a plurality of management tracks are defined in the distribution content corresponding to a plurality of different uses of the content body, and the plurality of different uses are different in terms of at least one of a reproduction section of the content body and a reproduction condition of the content body.

10. A content distribution system comprising:

a distribution content creating apparatus operable to create a distribution content including a content body provided with a use condition;

a distributing apparatus operable to distribute the distribution content created by said distribution content creating apparatus; and a terminal operable to receive and use the distribution content distributed by said distributing apparatus;

wherein said distribution content creating apparatus includes:

a content storage part operable to store content bodies;

a distribution content creating part operable to create the distribution content by reading a content body from said content storage part and providing the read content body with the use condition; and a first distribution content storage part operable to store the distribution content created by said distribution content creating part;

wherein said distribution content creating part includes a management data editing part operable to edit management data for at least one specific section of the read content body indicating the use condition of the specific section;

wherein the specific section of the read content body is at least one of a plurality of sections on a time axis constituting the read content body;

wherein said distribution content creating part is further operable to create the distribution content by providing the content body with a plurality of pieces of the management data edited by said management data editing part, and with management track data which defines, as a management track, a collection of at least one management data selected from the plurality of pieces of management data;

wherein a plurality of management tracks are defined in the distribution content corresponding to a plurality of different uses of the content body, and the plurality of different uses are different in terms of at least one of a reproduction section of the content body and a reproduction condition of the content body; and wherein said terminal includes:

a receiving part operable to receive the distribution content distributed by said distributing apparatus;

a second distribution content storage part operable to store the distribution content received by said receiving part; and replay part operable to read the distribution content from said second distribution content storage part, to select one of the plurality of management tracks included in the distribution content stored in said second distribution content storage part according to one of the plurality of different uses, and to replay, according to the selected management track, the specific section of the content body.

11. A terminal for receiving a distribution content including a content body, and a plurality of pieces of management data respectively indicating a use condition which is effective to a specific section of the content body, the specific section of the read content body being at least one of a plurality of sections on a time axis constituting the read content body, and the plurality of pieces of management data having management track data which defines as a management track a collection of at least one management data selected from the plurality of pieces of management data, wherein a plurality of management tracks are defined in the distribution content corresponding to a plurality of different uses of the content body, and the plurality of different uses are different in terms of at least one of a reproduction section of the content body and a reproduction condition, said terminal comprising:

a receiving part operable to receive the distribution content;

a distribution content storage part operable to store the distribution content received by said receiving part; and a replay part operable to read the distribution content from said distribution content storage part, to select one of the plurality of management tracks included in the distribution content stored in said distribution content storage part according to one of the plurality of different uses, and to replay, according to the selected management track, the specific section of the content body.

12. The terminal according to claim 11, wherein:

the use condition indicated by the management data prohibits the use of the section specified by the management data, allows the use of the section specified by the management data for free, or allows the use of the section specified by the management data in return for payment of a predetermined fee;

said terminal further comprises a billing part operable to charge a fee based on the management data; and said replay part is operable to replay the section when the use condition allows the use of the section for free, and said replay part is operable to replay the section after said billing part charges the fee when the use condition allows the use of the section in return for payment of the predetermined fee.

13. The terminal according to claim 11, wherein the management data further indicates a replay order of the section specified by the management data, and said replay part is operable to replay at least one section specified by the management data in the replay order indicated by the management data.

14. A distribution content in which an arrangement of information is contained and which is embodied in a processor readable memory of a terminal, said distribution content comprising:

a content body; and at least one piece of management data each for at least one specific section of the read content body and indicating the use condition of the specific section;

the specific section of the read content body being at least one of a plurality of sections on a time axis constituting the read content body; and management track data which defines, as a management track, a collection of at least one management data selected from a plurality of pieces of the management data;

wherein a plurality of management tracks are defined in the distribution content corresponding to a plurality of different uses of the content body, and the plurality of different uses are different in terms of at least one of a reproduction section of the content body and a reproduction condition of the content body; and wherein the plurality of management tracks are each selectable by the terminal according to a corresponding one of the plurality of different uses, wherein when the terminal selects one of the plurality of management tracks according to one of the plurality of different uses, the terminal is operable to reproduce, according to the selected management track, the specific section of the content body.

15. The distribution content embodied in the processor readable memory of the terminal according to claim 14, wherein the use condition indicated by the management data prohibits the use of the section specified by the management data, allows the use of the section specified by the management data for free, or allows the use of the section specified by the management data in return for payment of a predetermined fee.

16. The distribution content embodied in the processor readable memory of the terminal according to claim 14, wherein the management data further indicates a replay order of the section specified by the management data.

* * * * *